United States Patent
Bringuier et al.

(10) Patent No.: US 10,379,306 B2
(45) Date of Patent: Aug. 13, 2019

(54) LASER SINTERED FLEXIBLE RIBBON

(71) Applicant: CORNING OPTICAL COMMUNICATIONS LLC, Hickory, NC (US)

(72) Inventors: Anne Germaine Bringuier, Taylorsville, NC (US); David Wesley Chiasson, Edmonton (CA); Barada Kanta Nayak, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/817,338

(22) Filed: Nov. 20, 2017

(65) Prior Publication Data

US 2018/0149821 A1 May 31, 2018

Related U.S. Application Data

(60) Provisional application No. 62/427,611, filed on Nov. 29, 2016.

(51) Int. Cl.
*G02B 6/44* (2006.01)
*G02B 6/36* (2006.01)
(Continued)

(52) U.S. Cl.
CPC .......... *G02B 6/4403* (2013.01); *B29C 64/153* (2017.08); *G02B 6/36* (2013.01); *G02B 6/448* (2013.01); *B29L 2011/0075* (2013.01)

(58) Field of Classification Search
CPC .................................... G02B 6/44; G02B 6/36
(Continued)

(56) References Cited

U.S. PATENT DOCUMENTS 4,751,613 A * 6/1988 Werdin ................ H05K 1/0218
361/799
4,980,007 A * 12/1990 Ferguson ............... G02B 6/448
156/178
(Continued)

FOREIGN PATENT DOCUMENTS

| JP | 5291052 B2 | 9/2013 |
| JP | 2014016530 A | 1/2014 |
| JP | 2014085592 A | 5/2014 |

OTHER PUBLICATIONS

International Search Report and Written Opinion PCT/US2017/061884 dated Feb. 16, 2018.

*Primary Examiner* — Kaveh C Kianni
(74) *Attorney, Agent, or Firm* — William D. Doyle

(57) ABSTRACT

A rollable optical fiber ribbon includes a plurality of optical transmission elements, wherein each optical transmission element includes an optical core surrounded by a cladding of a different refractive index than the optical core, the cladding surrounded by a fiber coating layer, the fiber coating layer having an inner surface contacting the cladding and an outer surface defining an exterior surface of the optical transmission elements; and a coupling element coupled to and supporting the plurality of optical transmission elements in an array. The coupling element forms a chevron pattern and is formed from a flexible polymeric material such that the plurality of optical transmission elements are reversibly movable from an unrolled position in which the plurality of optical transmission elements are substantially aligned with each other to a rolled position.

6 Claims, 4 Drawing Sheets

(51) Int. Cl.
*B29C 64/153* (2017.01)
*B29L 11/00* (2006.01)

(58) Field of Classification Search
USPC .......................................................... 385/114
See application file for complete search history.

(56) References Cited

U.S. PATENT DOCUMENTS

| | | | | |
|---|---|---|---|---|
| 5,076,881 A * | 12/1991 | Ferguson | ............... | G02B 6/448 156/179 |
| 5,379,363 A * | 1/1995 | Bonicel | ............... | G02B 6/4482 347/106 |
| 5,412,497 A * | 5/1995 | Kaetsu | ............... | G02B 6/4452 385/134 |
| 5,920,664 A * | 7/1999 | Hirabayashi | ............... | G02B 6/43 349/196 |
| 6,305,848 B1 * | 10/2001 | Gregory | ............... | G02B 6/4246 385/134 |
| 6,584,257 B1 * | 6/2003 | Hurley | ............... | G02B 6/4471 385/109 |
| 6,868,219 B2 * | 3/2005 | Lipski | ............... | G02B 6/4452 385/135 |
| 8,563,131 B2 | 10/2013 | Mhetar et al. | | |
| 8,787,718 B2 | 6/2014 | Tanabe et al. | | |
| 8,895,326 B2 | 11/2014 | Sekiya et al. | | |
| 2001/0002943 A1 * | 6/2001 | Nagayama | ............... | C03B 37/0253 385/100 |
| 2001/0030855 A1 * | 10/2001 | Green | ............... | G02B 6/4277 361/754 |
| 2002/0008463 A1 * | 1/2002 | Roach | ............... | G09F 9/305 313/492 |
| 2002/0028048 A1 * | 3/2002 | Dair | ............... | G02B 6/4214 385/92 |
| 2002/0030872 A1 * | 3/2002 | Dair | ............... | G02B 6/4214 398/135 |
| 2002/0033979 A1 * | 3/2002 | Dair | ............... | G02B 6/4214 398/164 |
| 2002/0197032 A1 * | 12/2002 | Conrad | ............... | G02B 6/4482 385/114 |
| 2003/0016924 A1 * | 1/2003 | Thompson | ............ | G02B 6/4482 385/114 |
| 2003/0020986 A1 * | 1/2003 | Pang | ............... | G02B 6/4201 398/139 |
| 2003/0053786 A1 * | 3/2003 | Kato | ............... | G02B 6/43 385/134 |
| 2003/0174953 A1 * | 9/2003 | Carnevale | ............... | G02B 6/366 385/39 |
| 2004/0069997 A1 * | 4/2004 | Dair | ............... | G02B 6/4214 257/81 |
| 2005/0084200 A1 * | 4/2005 | Meis | ............... | G02B 6/3608 385/14 |
| 2006/0045417 A1 * | 3/2006 | Morita | ............... | G02B 6/43 385/31 |
| 2006/0211294 A1 * | 9/2006 | Lipski | ............... | G02B 6/4452 439/488 |
| 2008/0019647 A1 | 1/2008 | Sato et al. | | |
| 2011/0110635 A1 * | 5/2011 | Toge | ............... | G02B 6/4403 385/102 |
| 2012/0045166 A1 * | 2/2012 | Trotabas | ............... | G02B 6/4403 385/14 |
| 2013/0028563 A1 * | 1/2013 | Matsuzawa | ............ | G02B 6/4482 385/120 |
| 2013/0156390 A1 | 6/2013 | Matsuzawa et al. | | |
| 2013/0343712 A1 * | 12/2013 | Matsuzawa | ............ | G02B 6/448 385/102 |
| 2014/0016905 A1 * | 1/2014 | Tanabe | ............... | G02B 6/4403 385/114 |
| 2014/0314382 A1 * | 10/2014 | Sato | ............... | G02B 6/4403 385/103 |
| 2015/0346445 A1 * | 12/2015 | Blazer | ............... | G02B 6/4403 385/114 |
| 2016/0091686 A1 * | 3/2016 | Erdman | ............... | G02B 6/4453 385/135 |
| 2016/0299310 A1 * | 10/2016 | Kaneko | ............... | G02B 6/44 |
| 2017/0153402 A1 | 6/2017 | Chiasson et al. | | |
| 2017/0219790 A1 * | 8/2017 | Debban | ............... | G02B 6/4403 |
| 2017/0219792 A1 * | 8/2017 | Debban | ............... | G02B 6/4483 |
| 2017/0336566 A1 * | 11/2017 | Burek | ............... | G02B 6/2553 |
| 2018/0039035 A1 * | 2/2018 | Chiasson | ............... | G02B 6/4403 |

\* cited by examiner

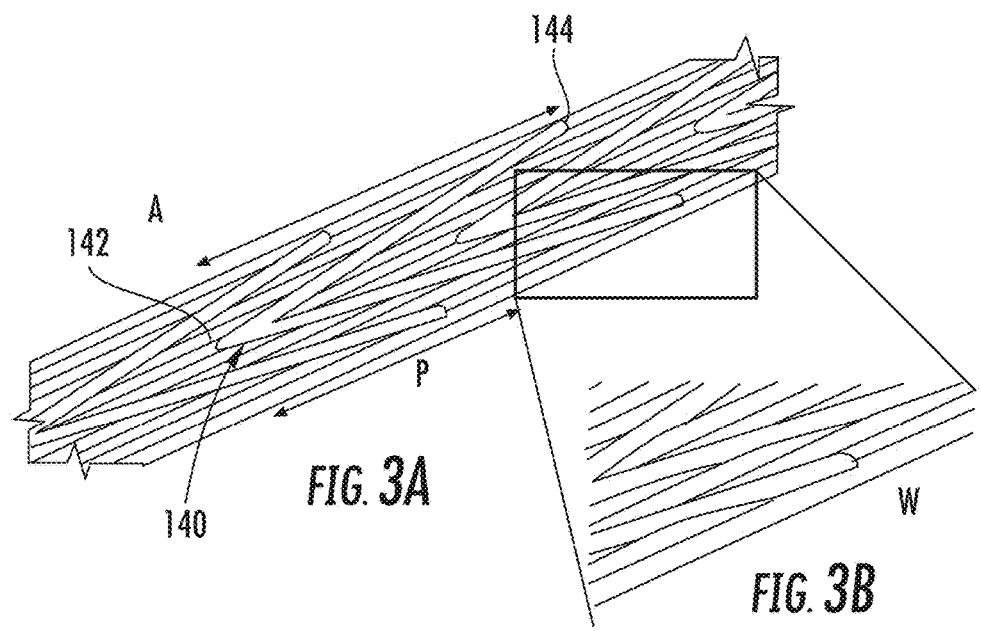
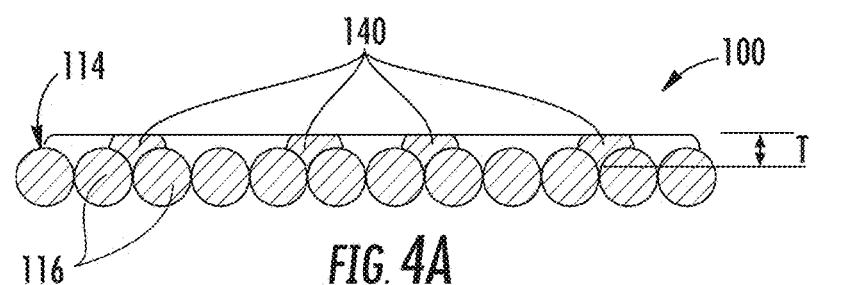
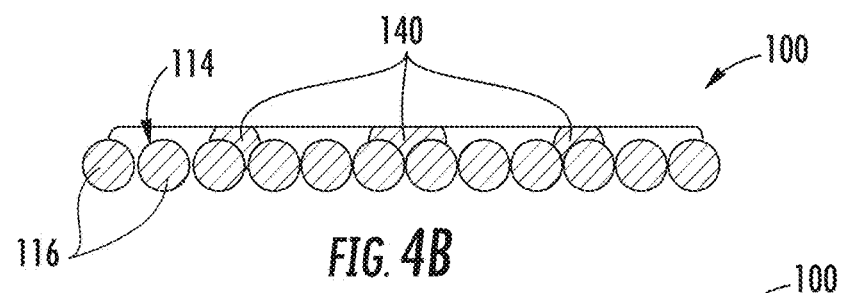
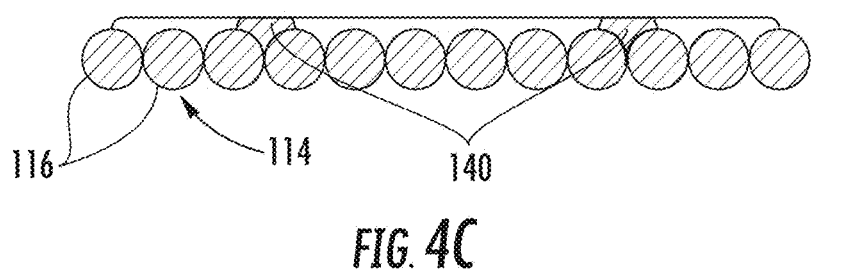

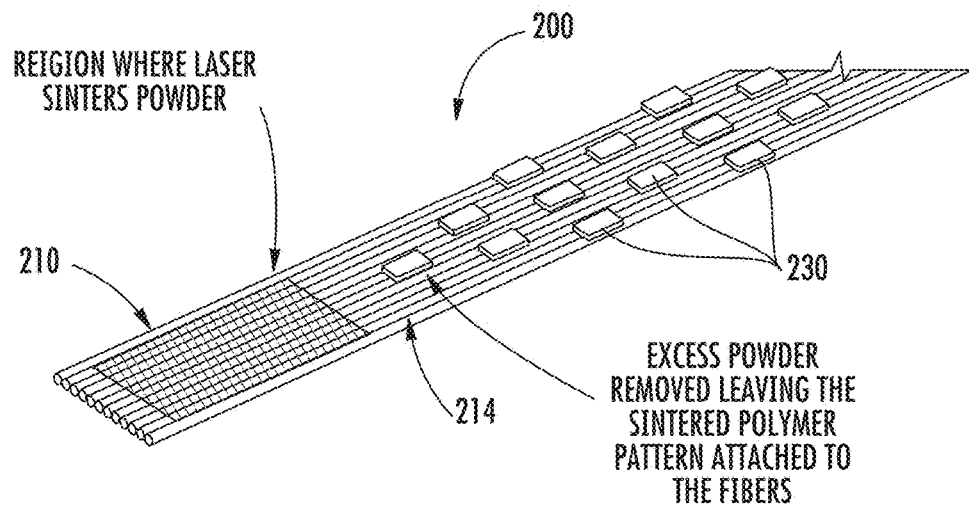
FIG. 5
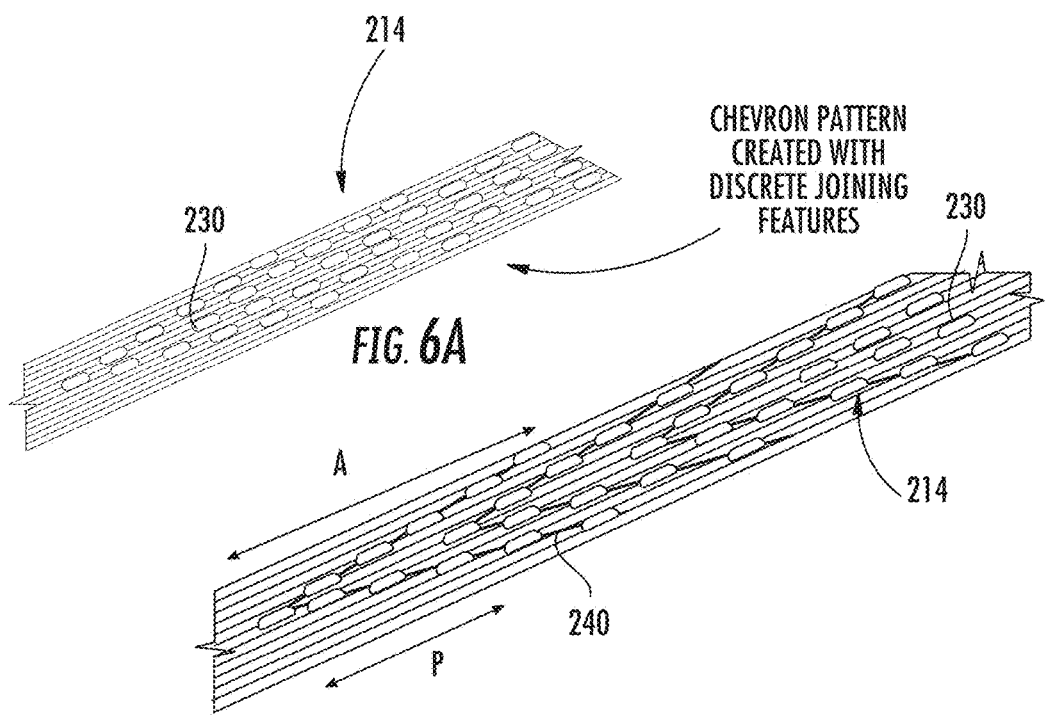
FIG. 6A
FIG. 6B

US 10,379,306 B2

LASER SINTERED FLEXIBLE RIBBON

PRIORITY APPLICATION

This application claims the benefit of U.S. Provisional Application No. 62/427,611, filed on Nov. 29, 2016, the content of which is relied upon and incorporated herein by reference in its entirety.

BACKGROUND

The disclosure relates generally to optical fibers and more particularly to optical communication or fiber ribbons. Optical fibers have seen increased use in a wide variety of electronics and telecommunications fields. Optical fiber ribbons may hold multiple optical fibers together in a group or array. The optical fiber ribbon includes a body formed from a material that holds the optical fibers together and/or that provides structure that assists in the handling and connecting of the optical fibers of the ribbon to various components or devices.

SUMMARY

Conventional optical ribbons are comprised of a planar array of optical fibers that are joined continuously along the length by an ultraviolet (UV) cured acrylate coating. The primary advantage of such a fiber cable sub-unit is fiber organization. The organization of the fibers within ribbons allows for reduced cable diameters and reduced time in the stripping/cleaving/splicing operation. However, this construction may limit the flexibility of smaller cable constructions. Bending of the cable along an axis that is perpendicular to the major axis of the ribbon necessitates either the rotation of the entire cable or the rotation of the ribbon within the cable construction. In either case, the flexibility of the cable may be hampered by a ribbon with 4 fibers or greater. It is therefore desirable to create a ribbon construction that maintains some of the organizational attributes (and thus the installation efficiencies) of the continuous ribbon construction but allows for relative lateral and axial movement of the groups of fibers relative to each other so that uniaxial bending flexibility of the construction is achieved. A ribbon structure that can easily transition from flat to semi-round and then back to flat will result in more flexible cables and reduced low fiber count ribbon cable sizes.

One embodiment of the disclosure relates to a rollable optical fiber ribbon including a plurality of optical transmission elements. Each optical transmission element includes an optical core surrounded by a cladding of a different refractive index than the optical core, and the cladding is surrounded by a fiber coating layer. The fiber coating layer has an inner surface contacting the cladding and an outer surface defining an exterior surface of the optical transmission elements. The ribbon also includes coupling elements coupled to and supporting the plurality of optical transmission elements in a structured array.

In an effort to improve the degree of flexibility for the structured fiber array, aspects of the present disclosure include a structure where individual or groups (subunits) of fibers are joined intermittently along the length of the ribbon. A method of joining the fibers or groups of fibers utilizes a secondary thermoplastic material which bonds to a UV curable acrylate material of the colored fibers or the ribbon subunits. The raw secondary material may be in the form of a thermoplastic powder or a thermoplastic or whereby the material will be deposited and then melted/sintered using laser radiation. Once the coating material is in the appropriate form, the coating is allowed to cool and assume its final shape. The laser can melt the powder within discrete regions along the length of the ribbon product thus creating non-continuous polymer coupling features that hold the fiber array together.

In accordance with aspects of the present disclosure, a rollable optical fiber ribbon includes a plurality of optical transmission elements, wherein each optical transmission element includes an optical core surrounded by a cladding of a different refractive index than the optical core, the cladding surrounded by a fiber coating layer, the fiber coating layer having an inner surface contacting the cladding and an outer surface defining an exterior surface of the optical transmission elements; and a coupling element coupled to and supporting the plurality of optical transmission elements in an array. The coupling element forms a chevron pattern and is formed from a flexible polymeric material such that the plurality of optical transmission elements are reversibly movable from an unrolled position in which the plurality of optical transmission elements are substantially aligned with each other to a rolled position.

In accordance with yet other aspects of the present disclosure, a method of manufacturing an optical fiber ribbon includes arranging a plurality of optical a plurality of optical transmission elements in parallel to form an array, wherein each optical transmission element includes an optical core surrounded by a cladding of a different refractive index than the optical core, the cladding surrounded by a fiber coating layer, the fiber coating layer having an inner surface contacting the cladding and an outer surface defining an exterior surface of the optical transmission elements. The fiber array is moved longitudinally and a polymer powder dispensed on the moving fiber array. A laser beam is focused onto the moving fiber array such that the laser beam melts the polymer powder to form a polymer coupling element that bonds to the fiber array.

BRIEF DESCRIPTION OF THE DRAWINGS

According to common practice, the various features of the drawings discussed below are not necessarily drawn to scale. Dimensions of various elements in the drawings may be expanded or reduced to more clearly illustrate embodiments of the invention.

FIGS. 3A and 3B are isolated isometric views of the continuous chevron joining features shown in FIG. 2, in accordance with aspects of the present disclosure.

FIG. 4A is a sectional view of the optical fiber ribbon shown in FIG. 2 as taken along sectional line D-D, in accordance with aspects of the present disclosure.

FIG. 4B is a sectional view of the optical fiber ribbon shown in FIG. 2 as taken along sectional line E-E, in accordance with aspects of the present disclosure.

FIG. 4C is a sectional view of the optical fiber ribbon shown in FIG. 2 as taken along sectional line F-F, in accordance with aspects of the present disclosure.

FIG. 5 is a perspective view of an optical fiber ribbon forming process involving laser sintering, in accordance with aspects of the present disclosure.

FIGS. 6A and 6B are isolated perspective views an optical fiber ribbon with a discontinuous chevron joining feature, in accordance with aspects of the present disclosure.

DETAILED DESCRIPTION

Figure 1:
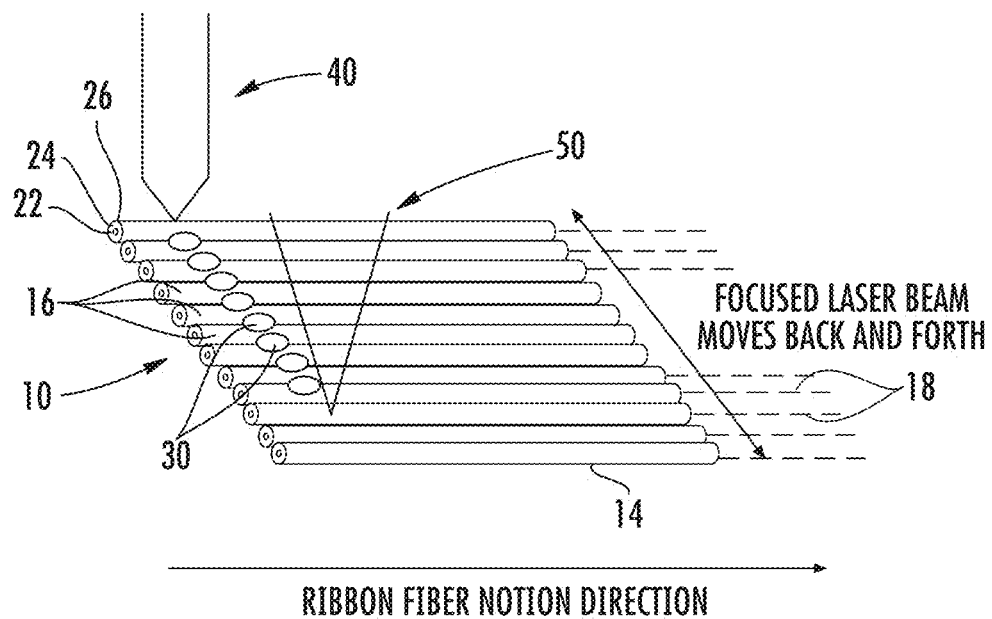
FIG. 1 is a perspective view of an optical fiber ribbon forming process involving laser sintering, in accordance with aspects of the present disclosure.

Reference is now made in detail to the present preferred embodiments of the disclosure, examples of which are illustrated in the accompanying drawings. Whenever possible, identical or similar reference numerals are used throughout the drawings to refer to identical or similar parts.

FIG. 1 illustrates a laser sintering process in accordance with aspects of the present disclosure. Referring to FIG. 1, a rollable optical ribbon, shown as optical fiber ribbon 10, is shown according to an exemplary embodiment. Ribbon 10 includes an array 14 of a plurality of optical transmission elements, shown as optical fibers 16. In the embodiment shown, ribbon 10 is shown in an unrolled or aligned position, and in this position, array 14 is a parallel array of optical fibers in which the central axes 18 of each fiber (i.e., the axis of each optical fiber 16 perpendicular to the cross-section shown in FIG. 4) are substantially parallel to each other. In other embodiments, the optical fibers may be arranged in non-parallel arrays within the array 14 (e.g., two by two arrays, staggered arrays, etc.).

In the embodiment shown, ribbon 10 includes a single linear array 14 of twelve optical fibers 16. In some other embodiments, ribbon 10 includes multiple arrays 14 of optical fibers 16. In accordance with yet other aspects of the present disclosure, each linear array 14 of ribbon 10 has at least two optical fibers 16, for example, or may have four, six, eight, twelve, twenty four, or thirty six optical fibers 16.

In the embodiment shown, each optical fiber 16 includes a central portion that includes an optically transmitting optical core 22 and a cladding layer 24. Optical fibers 16 also each include a coating layer 26. The optical core 22 is formed from a material that transmits light, and the optical core is surrounded by a cladding layer 24 that has a different refractive index (e.g., a lower refractive index) than the optical core 22 such that the optical fiber acts as a waveguide that retains a light signal within optical core 22.

Coating layer 26 surrounds both optical core 22 and cladding layer 24. In particular, coating layer 26 has an inner surface that contacts and is bonded to the outer surface of cladding layer 24. Coating layer 26 also has an outer surface that defines the outer or exterior surface of each optical fiber 16. In the embodiment shown, coating layer 26 is a single layer formed from a single material that provides protection (e.g., protection from scratches, chips, etc.) to optical fibers 16. In various embodiments, coating layer 26 may be a UV curable acrylate material, and may have a thickness between 10 μm and 100 μM.

As shown in FIG. 1, a laser sintering process may be used to form coupling elements 30 that bond one or more of the optical fibers 16 of the array 14. The coupling elements 30 may be formed to be continuous elements bonding any number of optical fibers, or may be intermittent elements bonding adjacent optical fibers at select locations, for example. As shown by the arrow at the lower portion of FIG. 1, the array 14 may be configured to move in a longitudinal direction with the optical fibers 16 arranged to lie in a substantially flat, parallel manner. Although shown in a particular configuration in FIG. 1, the array 14 may be arranged in layers, with stacked groups of fibers, or may consist of multiple groups of fibers, each group of fibers already structurally bonded to form a multifiber subunit. A powder feeder 40 dispenses a given amount of polymer powder on the moving fiber array 14 and a focused laser beam 50 from a laser melts the polymer powder, binding the polymer to the fiber array to create discrete patterns of coupling of the fibers 16. By synchronizing fiber array motion, the laser beam motion and laser turn ON and OFF, along with laser spot shape, several patterns may be generated for the coupling elements 30. In accordance with yet other aspects of the present disclosure, the sintering process may include preheating of the fibers 16 using an infrared emitter to enhance/assist the bonding process.

Laser sintering allows for the creation of discrete supporting structures that cannot be achieved with conventional UV liquid coating or extrusion technology. For example, coupling features may be applied to both the top and bottom of the ribbon. Multiple passes may be used in the creation of thick layers while keeping the laser intensity to a minimum. Applying the thermoplastic layer to only one side of the ribbon can facilitate the easy removal of single fibers without compromising the entire array.

Laser sintering allows the use of cheaper thermoplastic materials in the creation of a ribbon product and, by using less thermoplastic material compared to the amount of matrix needed for conventional ribbons, lower cable weights for high fiber count cables can be more easily attained. Additional manufacturing efficiencies may be attained because of the ability to quickly convey, melt, and cool a thermoplastic material without the use of large, high heat capacity equipment such as an extruder typical in conventional ribbon processing. Moreover, powder application and laser sintering as described above will result in lower stress on the fibers and thus reduce the possibility of attenuation increases.

The polymer powder may be a polyamide based powder, such as Nylon 11 or 12, having lower melting temperatures in the 180° to 190° C. range. Flame retardant (FR) polyamide powders may be used if FR properties are desired. Other polyamide materials may be used, especially those materials with a melting temperature below 200° C. Polyester based powder adhesives and EVA based hot-melts may be used as these powders typically have lower melting temperatures between 100° to 150° C., some even having melting temperatures lower than 100°. Polypropylene based powders such as Coathylene from Axaltacs may also be used. The polymer used for sintering can have improved adhesion to the fibers when a pigment or additive is added into the polymer or if the fibers are ionized or corona/plasma treated before the sintering.

The polymer powder may be comprised of particles having an average size of less than 100 microns and close to spherical in shape. Accordingly, the spacing between fibers during powder application has to be less than the minimum powder particle size.

Figure 2:
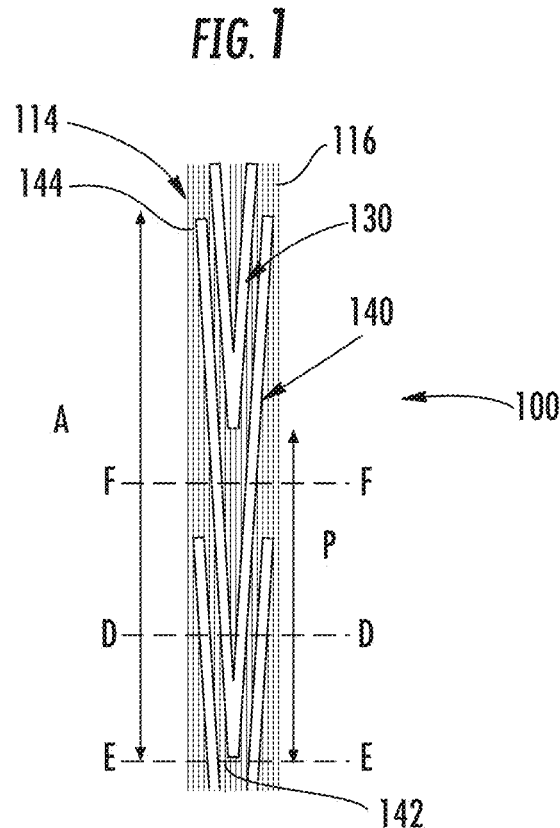
FIG. 2 is a top view of an optical fiber ribbon with a continuous chevron joining feature, in accordance with aspects of the present disclosure.

In accordance with aspects of the present disclosure, FIGS. 2-4 illustrate a rollable ribbon 100 configured with twelve optical fibers 116 arranged in a parallel array 114. Although the adjacent fibers 116 are illustrated as being in contact with one another, gaps may be provided between each of the fibers or select fibers as desired. Coupling elements 130 are shown, which may be formed using the laser sintering process described above. In particular, coupling elements 130 are created with the continuous application of a layer of thermoplastic powder (or film) to the array 114 of fibers. A laser is then used to selectively sinter the polymer and attach/join any fibers together in the vicinity of the application of the laser radiation. As shown in FIGS. 2-4, the coupling elements 130 may be in the shape of a continuous chevron pattern 140. The chevron pattern 140 is continuous across the width of the ribbon 100 such that at any two points along the length of the ribbon there are at least 2 pairs of fibers joined within the array 114 of twelve fibers 116. This is shown in FIGS. 4A-4C. FIG. 4A is a cross-section of ribbon 100 taken along line D-D in FIG. 2 indicating a coupling of adjacent fibers at four lateral locations due to the overlap nature of the two individual chevron features. FIG. 4B is a cross-section of ribbon 100 taken along line E-E in FIG. 2 indicating a coupling of adjacent fibers at three lateral locations as defined by the index tip 142 of a first chevron joining feature and the two legs 144 of a second chevron joining feature. FIG. 4C is a cross-section of ribbon 100 taken along line F-F in FIG. 2 indicating a coupling of adjacent fibers at two lateral locations as defined by the two legs 144 of a single chevron joining feature.

The continuous chevron pattern 140 may be applied to one side of ribbon 100 but may also be applied to both the top and bottom of the ribbon 100. The indexing of each chevron in the chevron pattern 140 may be matched or can be offset. "A" represents the longitudinal length of a single chevron as measured from a plane intersecting the longitudinal axis of the ribbon 100 at the indexed point 142 of the chevron to a plane intersecting the longitudinal axis of the ribbon 100 at the end of the longest extension of one of the legs 144 of the chevron. For a 12 fiber ribbon, "A" is preferably greater than 15 mm and less than 50 mm. P is the periodic length between indexed points 142 of adjacent chevrons in the chevron pattern 140. For a 12 fiber ribbon, P is preferably greater than 5 mm and less than 20 mm. As shown in FIG. 3B, W is the thickness of the laser sintered polymer forming the chevron pattern 140. For a 12 fiber ribbon, W is preferably greater than 50 µm and less than 500 µm. T is the thickness of the coupling element 130 over the fiber surface and is preferably greater than 10 µm and less than 100 µm. The polymer will fill the interstitial spaces between the fibers 116 up to but not including the region of minimum spacing between the fibers.

The array 114 is configured with the chevron pattern 140 in various ways to allow ribbon 100 to be reversibly moved from an unrolled or aligned position (shown in FIGS. 2-4) to a curved or rolled position (see, e.g., FIG. 8), while still providing sufficient support and structure for fibers 116. In the unrolled or aligned position, shown in FIG. 2, for example, optical fibers 116 of the linear array 114 are substantially aligned with each other such that the central axes of the optical fiber 116 are parallel to each other and lie along the same central fiber plane. As used herein, substantial alignment between optical fibers 116 allows for some deviation between the central axes 118 of the optical fibers and central fiber plane, such that the central axis of each substantially aligned fiber is spaced less than 45 µm, in some embodiments less than 20 µm, in other embodiments less than 10 µm, and in other embodiments less than 5 µm, from central fiber plane 30 and/or the maximum vertical distance (in the orientation of FIG. 2) between the center points of any of the fibers 16 is 90 µm or less.

Figure 7:
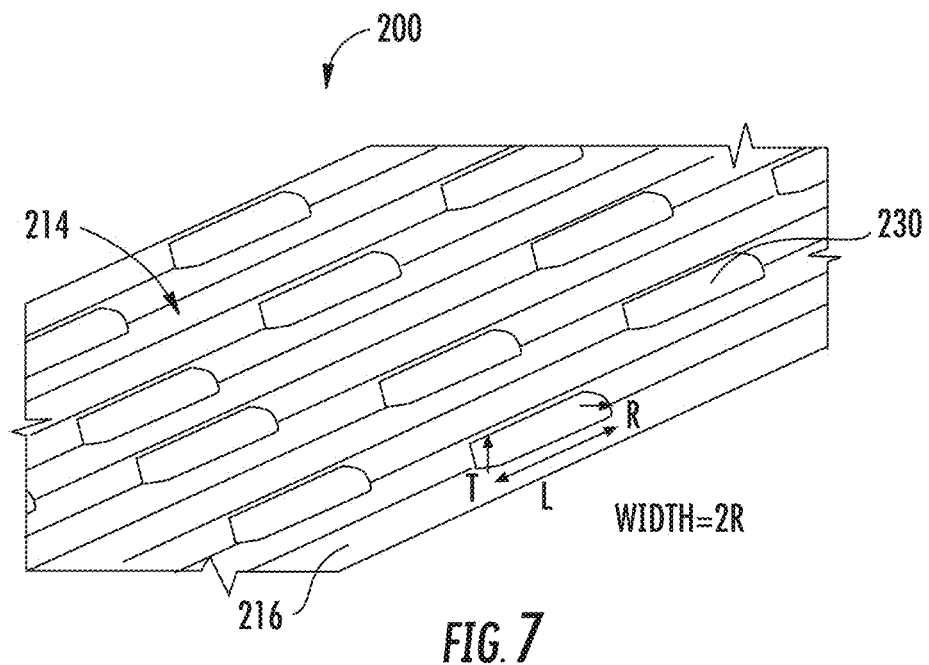
FIG. 7 is an isolated perspective view of an optical fiber ribbon illustrating discontinuous chevron coupling elements, in accordance with aspects of the present disclosure.

FIGS. 5-7 illustrate a discontinuous chevron configuration for the coupling elements 230 of a ribbon 200. As shown in FIG. 5, coupling elements 230 are created with the continuous application of a layer 210 of thermoplastic powder (or film) to the array 214 of fibers. A laser is then used to selectively sinter the polymer and attach/join any fibers together in the vicinity of the application of the laser radiation. One can selectively attach a continuous film to the fibers 216. The coupling elements 230 are discontinuous across the width of the ribbon and with the majority of each individual coupling element 230 located between two adjacent fibers. FIGS. 6A and 6B illustrate a preferred embodiment in which a chevron pattern 240 of discontinuous individual coupling elements 230 is formed as shown such that at any one bonding location along the length of the ribbon there are at least 3 pairs of fibers joined within a group of 12 fibers. For a 12 fiber ribbon, A is preferably greater than 5 mm and less than 50 mm, P is preferably greater than 5 mm and less than 20 mm, W is preferably greater than 50 µm and less than 500 µm, and T (thickness above the fiber surface) is preferably greater than 10 µm and less than 100 µm.

Figure 8:
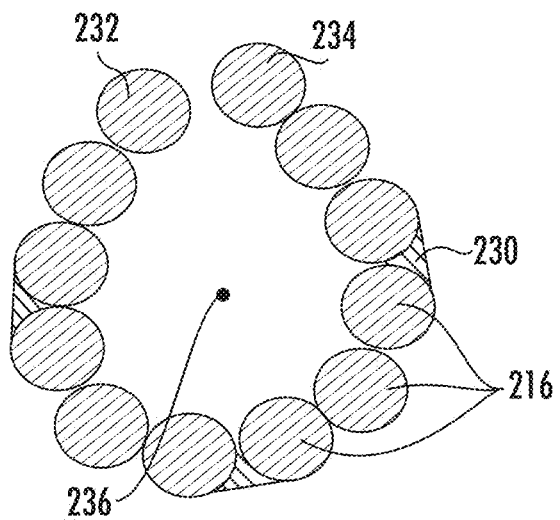
FIG. 8 is a cross-sectional view of an optical fiber ribbon in a rolled up position, in accordance with aspects of the present disclosure

FIG. 8 illustrates the ribbon 200 in a rolled position. To move from the unrolled position of FIGS. 5-7 to the rolled position shown in FIG. 8, ribbon 200 is bent or curved around ribbon longitudinal axis 236. Thus, in the curved position, fibers 216 define an arc or curve around longitudinal axis 236, and the horizontal distance between a first end fiber 232 and a second end fiber 234 is decreased. In this arrangement, when rolled ribbon 200 is held straight the central axes of optical fibers 216 are substantially parallel to longitudinal axis 236. In the embodiment shown in FIG. 8, ribbon 200 in the curved position assumes a substantially circular arrangement such that first end fiber 232 is brought into close proximity or into contact with second end fiber 234. In specific embodiments, the rollable ribbons discussed herein may be in a rolled configuration within the cable, and an end of the ribbon may be returned to the unrolled position to be coupled to an optical connector, such as via use of mass splicing equipment.

In various embodiments, the structure and/or material properties of ribbon 200 discussed herein provides for an improved ribbon that balances rollability with fiber support. In contrast to non-rollable conventional optical ribbons in which the ribbon matrix completely surrounds the optical fibers, it is believed the rollability of ribbon 200 is enhanced by the coupling features 230, particularly the coupling features provided in the chevron configuration 240.

An alternative method to the laser sintering of powders may be the application of inks, for example, using an ink jet printer. Polymers used for 3D printing include polylactic acid biopolymer and ABS. However, ink jet technology is limited to application of liquid dots. The precision of the size and shape of the dot is limited to the machine and the properties of the fluid. Control of these parameters is important in ribbon designs with specific coupling patterns or attributes.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A rollable optical fiber ribbon comprising:
a plurality of optical transmission elements, wherein each optical transmission element includes an optical core surrounded by a cladding of a different refractive index than the optical core, the cladding surrounded by a fiber coating layer, the fiber coating layer having an inner surface contacting the cladding and an outer surface defining an exterior surface of the optical transmission elements; and
a plurality of coupling elements coupled to and supporting the plurality of optical transmission elements in an array, wherein the plurality of coupling elements forms a chevron pattern and is formed from a flexible polymeric material such that the plurality of optical transmission elements are reversibly movable from an unrolled position in which the plurality of optical transmission elements are substantially aligned with each other to a rolled position;
wherein the plurality of optical transmission elements comprises twelve optical fibers; and
wherein at least three pairs of fibers are joined at any one bonding location along a longitudinal length of the ribbon.

2. The rollable optical fiber ribbon of claim 1, wherein the chevron pattern is continuous across the width of the ribbon.

3. The rollable optical fiber ribbon of claim 1, wherein the chevron pattern is discontinuous across the width of the ribbon.

4. The rollable optical fiber ribbon of claim 1, wherein the plurality of coupling elements comprises a sintered polymer powder.

5. The rollable optical fiber ribbon of claim 1, wherein a longitudinal length of the chevron pattern is greater than 15 millimeters and less than 50 millimeters.

6. The rollable optical fiber ribbon of claim 1, wherein the array comprises a first side and a second side opposite the first side, and wherein the plurality of coupling elements supports the array from only the first side of the array.

\* \* \* \* \*

UNITED STATES PATENT AND TRADEMARK OFFICE
CERTIFICATE OF CORRECTION

PATENT NO. : 10,379,306 B2
APPLICATION NO. : 15/817338
DATED : August 13, 2019
INVENTOR(S) : Anne Germaine Bringuier et al.

Page 1 of 1

It is certified that error appears in the above-identified patent and that said Letters Patent is hereby corrected as shown below:

In the Claims

In Column 7, Line 22, Claim 1, delete "position:" and insert -- position; --, therefor.

Signed and Sealed this
Twenty-eighth Day of January, 2020

Andrei Iancu
*Director of the United States Patent and Trademark Office*